(«United States Patent [19]

Bergles

[11] 3,927,736
[45] Dec. 23, 1975

[54] DISC BRAKE FOR A BICYCLE AND LIKE VEHICLE
[75] Inventor: Eduard Bergles, Graz, Austria
[73] Assignee: Fichtel & Sachs A.G., Schweinfurt am Main, Germany
[22] Filed: Feb. 20, 1974
[21] Appl. No.: 444,093

[30] Foreign Application Priority Data
Feb. 23, 1973  Germany............................ 2308909

[52] U.S. Cl. ................. 188/26; 188/72.8; 188/73.3
[51] Int. Cl.² .......................................... B62L 1/00
[58] Field of Search ............ 188/24, 26, 18 A, 73.6,
188/72.8, 71.1, 73.3; 74/526, 531; 24/249 R,
249 FP; 301/1, 5 R

[56]            References Cited
         UNITED STATES PATENTS
2,612,968  10/1952  Hood ..................................... 188/26
3,193,899   7/1965  Johnson .......................... 24/249 FP
3,416,634  12/1968  Swift ..................................... 188/73.3
3,675,741   7/1972  Frei et al. ............................. 188/26
3,765,511  10/1973  Toyamasu............................ 188/26
         FOREIGN PATENTS OR APPLICATIONS
1,431,049   5/1967  France................................ 188/73.6

1,178,184   5/1959  France................................ 188/73.6
  227,747   1/1959  Australia............................. 188/73.6
  931,549   7/1963  United Kingdom................. 188/73.6
1,237,554   6/1960  France................................ 188/72.8
   18,614   9/1963  Japan.................................. 188/72.8
1,172,969   6/1964  Germany ............................ 188/72.8

Primary Examiner—Trygve M. Blix
Assistant Examiner—Edward R. Kazenske
Attorney, Agent, or Firm—Hans Berman

[57]            ABSTRACT

The rear wheel of a bicycle carries a coaxial brake disc which rotates between two brake shoes when a support for the brake shoes is pivoted on the chain stays of the bicycle frame into its operating condition and secured to the wheel shaft. An actuating mechanism on the support is controlled by the rider of the bicycle to move the brake shoes axially against the two radial faces of the brake shoe for contact in an area encompassed by an arc of about 60° so that the support together with the brake shoes and the actuating mechanism may be pivoted out of its operating condition without releasing the brake disc from the wheel, and the wheel then taken from the bicycle frame for replacement of a tire.

3 Claims, 11 Drawing Figures

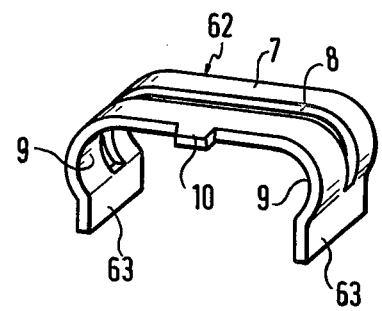
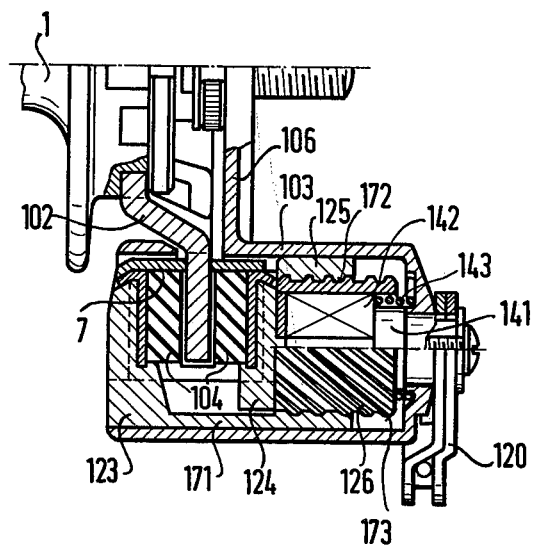
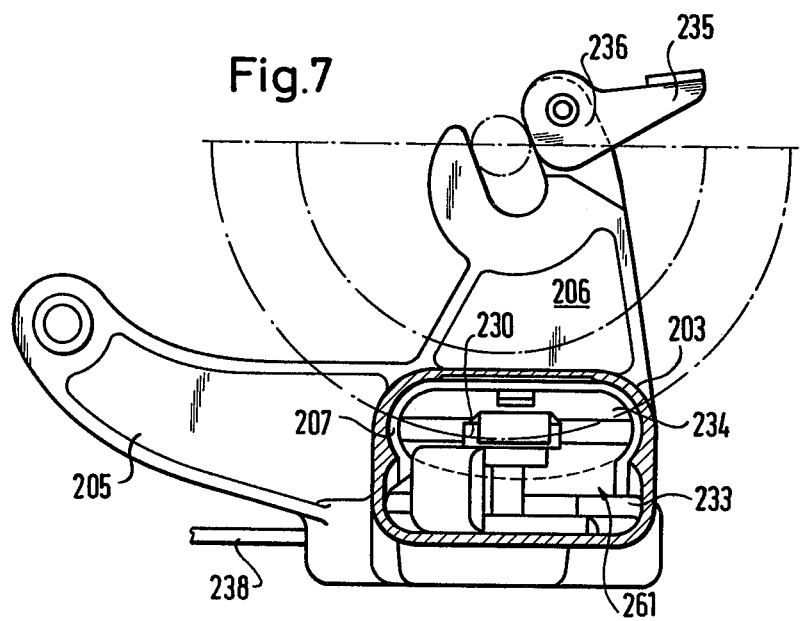

DISC BRAKE FOR A BICYCLE AND LIKE VEHICLE

This invention relates to brakes for driven vehicle wheels, such as the rear wheel of a bicycle or motor cycle, and more particularly to a disc brake and to a vehicle equipped with such a brake.

Disc brakes have important advantages in bicycles over the coaster brakes and rim brakes now in common use. Coaster brakes are suited only for bicycles having a single transmission ratio between the pedals and the driven wheel or having a multiple-speed rear wheel hub. They cannot be used with derailleur arrangements. Caliper brakes acting on the wheel rims require frequent and careful adjustment for reliable and predictable performance. Moisture easily reaches the wheel rim and may dangerously reduce the available braking force. Disc brakes have none of these disadvantages.

A disc brake for use in bicycles has been disclosed in the German Published Pat. application No. 2,215,254, but it is a complex and expensive device which is difficult to install. It must be disassembled if the associated wheel requires a tire change.

It is an important object of this invention to provide a disc brake for the driven rear wheel of a bicycle or like vehicle which is light in weight, has but few moving parts, and does not interfere with the removal of the rear wheel for tire replacement.

The disc brake of the invention includes a support and securing means which releasbly secure the support to the bicycle frame. Two brake shoes are movably fastened on the support and receive therebetween a brake disc fastened to the associated wheel for joint rotation. A brake actuating mechanism on the support moves the brake shoes axially toward and away from a position of braking engagement with the radial contact faces of the brake disc. In this position, the brake shoes engage the contact faces in respective areas extending about the common axis of the wheel and the brake disc in arcs of much less than 180°. The support is fastened to the vehicle frame in such a manner that the support may be released from the frame until the brake disc clears the support, the brake shoes, and the actuating mechanism while the disc is still fastened to the wheel.

Other features, additional objects, and many of the attendant advantages of this invention will readily be appreciated as the same becomes better understood by reference to the following detailed description of preferred embodiments when considered in connection with the appended drawing in which:

FIG. 5 is a fragmentary, front elevational, mostly sectional view of the device of FIG. 4;

FIG. 6 is a perspective view of a brake shoe holder common to the devices of FIGS. 1 to 5;

FIG. 7 shows another disc brake for use in the bicycle of FIG. 1 in side elevation and partly in section;

Figure 1:
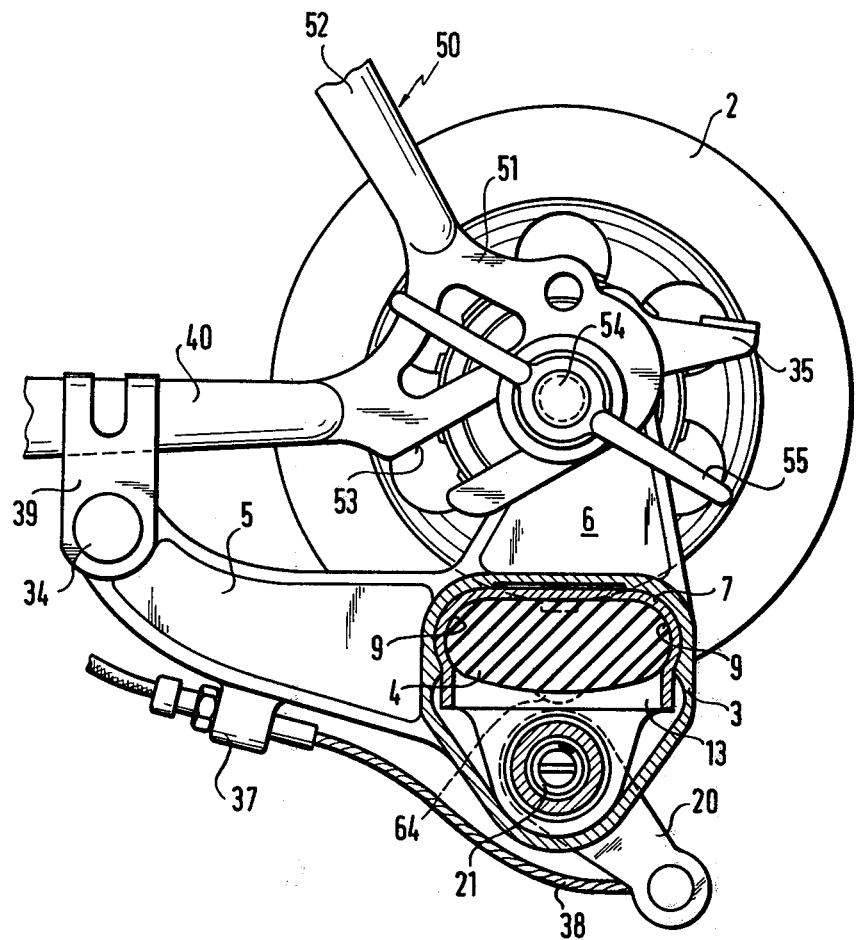
FIG. 1 shows a bicycle equipped with a disc brake of the invention in fragmentary side elevation and partly in section on the line I—I in FIG. 2.

Referring now to the drawing in detail, and initially to FIG. 1, there is shown only as much of an otherwise conventional bicycle as is needed for an understanding of this invention. The bicycle frame 50 is represented by the chain stays 40 and the seat stays 52 which converge toward a connecting plate 51. A slot 53 in the plate 51, obliquely open in a downward and forward direction, receives the rear wheel shaft 54 which is attached to the frame 50 by wing nuts 55.

Figure 2:
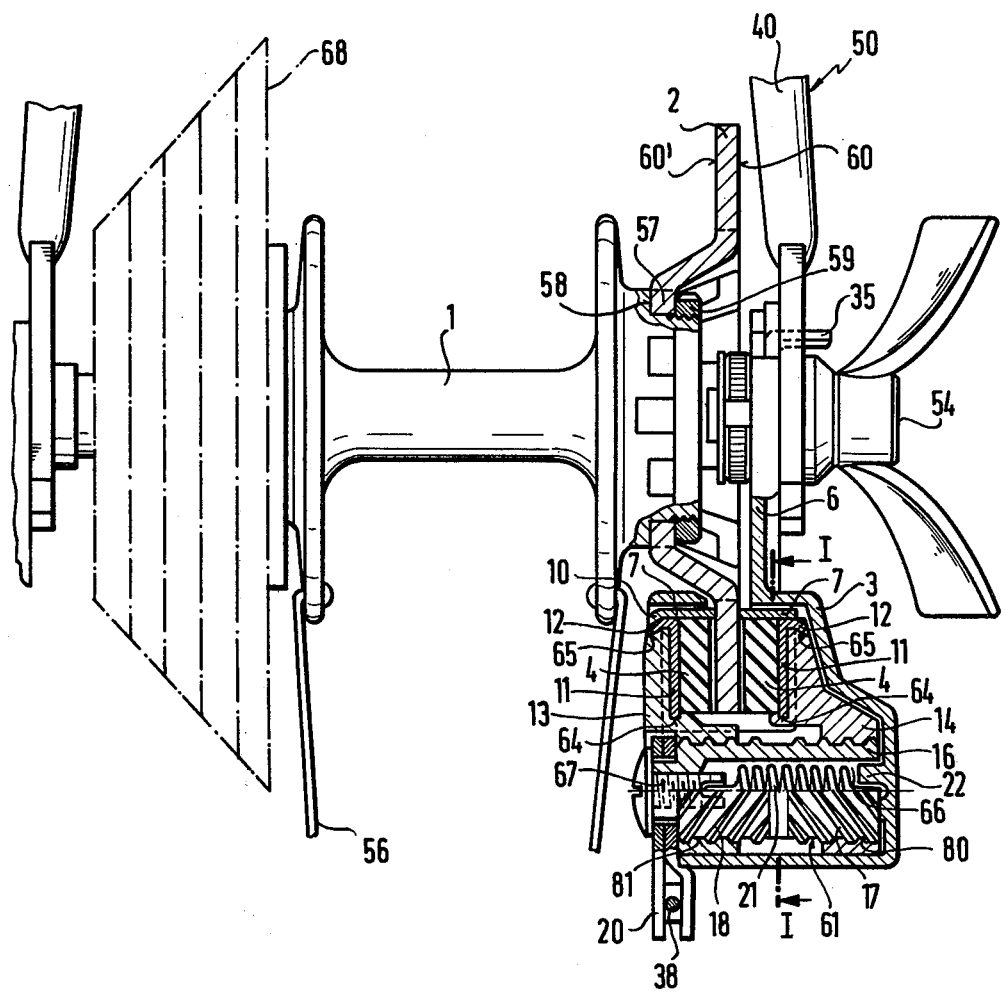
FIG. 2 shows the apparatus of FIG. 1 in front elevation and partly in section.

As is better seen in FIG. 2, the hub shell 1 of the rear wheel is rotatably mounted on the shaft 54, only a few spokes 56 of the rear wheel being shown in FIG. 2. A brake disc 2 is coaxially fastened on the hub shell 1 by means of integral radial lugs 57 engaging notches 58 in the shell 1. A threaded retaining ring 59 axially secures the disc 2 on the shell 1. The outer circumference of the disc 2 is movably received in a housing 3 over an arc of about 60°.

The housing serves as a support for two brake shoes whose body portions 13, 14 may move in the housing 3 in the direction of the common axis of the rear wheel and of the brake disc 2 toward and away from respective radial contact faces 60, 60' of the disc 2. Rubber composition linings 4 of each brake shoe engage the faces 60, 60' when the body portions 13, 14 of the shoes are moved toward each other by an actuating mechanism 61.

The brake shoes are quided in a brake shoe holder 7, best seen in FIG. 6, which is a channel-shaped sheet metal member. Parallel guide grooves 9 in the inner flange faces of the holder 7 conformingly receive portions of the brake shoe bodies 13, 14. A slot 8 extends through the web 62 and the contiguously adjacent parts of the flanges 63 of the holder 7. The disc 2 passes through the slot 8 with little axial clearance, as is shown in FIG. 2, into a space between the linings 4 of the brake shoes.

Each brake lining 4 is vulcanized to a metallic backing sheet 11. A radially outer projection of each sheet 11 is received in a recess 64 of the associated brake shoe body 13, 14. A hook-shaped, radially inner prong 12 of the sheet 11 is crimped over an edge of the brake shoe body in a notch 65 of the latter adjacent the holder 7. The linings 4 are thus secured radially on the associated body portions 13, 14 between the recesses 64 and the holder 7 when the brake shoes are moved into the holder 7 along the grooves 9 during assembly of the brake shoes with the holder 7. The shoes are axially secured in the holder 7 between a wall of the housing 3 remote from the spokes 56 and a lug 10 on the holder 7 where the housing 3 is open toward the wheel. The holder 7 is axially secured in the housing 3 by the disc 2 passing through the slot 8.

The brake actuating mechanism 61 includes a spindle 16 whose two axial halves carry right and left threads 17, 18 respectively. Coaxial bores in the body portions 13, 14 are provided with internal threads 80, 81 matingly engaged by the threads 17,18. The spindle 16 is hollow. An annular projection 22 on an inner face of the housing 3 is received as a stub shaft in an open axial end of the bore 66 in the spindle 16. The two ends of a clical torsion spring 21 are fastened respectively to the projection 22 and to a screw 67 which closes the other axial end of the spindle 16. The spring 21 tends to turn the spindle 16 in a direction to move the body portions 13, 14 and the associated brake linings 4 of the brake shoes axially away from the disc 2. A radial operating arm 20 is fixedly fastened to the spindle 16 by the screw 67 and causes the brake shoes to engage the disc 2 when the arm 20 is pulled by the wire 38 of a Bowden cable leading to a lever on the handle bars of the bicycle for manual control of the brake by the rider in a manner conventional in itself and not shown.

As is best seen in FIG. 2, the bicycle is equipped with a set of sprockets 68 on the axial end of the shaft 54 remote from the disc 2, as is conventional and shown only in phantom view. The housing 3 is attached to the frame 50 by means of two brackets 5, 6 which constitute a unitary casting with the housing 3. A short sleeve 37 on the bracket 5 serves as an anchor for the Bowden control cable whose wire 38 is attached to the arm 20. A pivot pin 34 fastens the free end of the bracket 5 to a clip 39 on one of the chain stays 40. The bracket 6 is directed upward from the housing 3 toward the rear wheel shaft 54 and is attached to the shaft in a manner shown in FIG. 3 with reference to the almost identical bracket 106 of a modified embodiment of the invention.

It is a common feature of the brackets 6, 106 that they are formed with a slot 69 open in an obliquely upward direction in the normal operating condition of the bicycle and circularly arcuate about the pivot axis of the pin 34. The shaft 54 is received in the slot 69 and locked in the slot by a locking mechanism 70 essentially consisting of a locking lever 35 pivotally mounted in a shallow recess 71 of the bracket 6. The shorter arm 36 of the lever 35 has a cam face shaped so that it wedgingly engages the shaft 54 in the illustrated condition to prevent movement of the shaft outward of the slot 69 while causing the lever 35 to swing out of the slot 69 during insertion of the shaft 54 into the radial orifice of the slot 69 when the housing 3 together with the brake shoes and the actuating mechanism 61 mounted thereon is swung counterclockwise into the position shown in FIGS. 1 and 3. The weight of the longer arm of the lever 35 normally biases the lever 35 into the illustrated locking position. The locking mechanism 70 is readily released by pressure manually applied to the longer arm of the lever 35. The wing nut 55 seen in FIG. 1 additionally secures the bracket 6 to the shaft 54, and its rotation is not impeded because of the recessed mounting of the lever 35 on the bracket 6.

When the rear wheel needs to be removed from the frame 50 for changing a tire or similar operations, the wing nut 55 is loosened until manual upward pressure on the exposed long arm of the lever 35 releases the shaft 54 from the slot 69 and permits the housing 3 with all elements mounted thereon to swing down, thereby releasing the brake disc 2, whereupon further removal of the wheel follows the usual procedure. After repair and installation of the wheel, and while the wing nut 55 is still loose, the housing 3 is swung counterclockwise on the pin 34 into the position seen in FIG. 1, and automatically secured by the lever 35 until the wing nut 55 can be tightened.

The housing 3 is also released from the shaft 54 when the brake needs to be serviced, as for replacement of the linings 4. Removal of the screw 67 releases the arm 20 and the spring 21, whereupon the holder 7, the brake shoes and the spindle 16 may be withdrawn through the open side of the housing 3, and the body portions 13, 14 separated from the spindle 16 by turning the latter. The brake shoe bodies 13, 14 may then be slid from the holder 7 along the grooves 9 away from the lug 10, and the linings 4 replaced without the use of tools by withdrawing the backing sheets 11 from the recesses 64, and inserting new linings, whereupon the original condition is restored by performing the afore-described steps in reverse order.

The modifications of the afore-described brake mechanism shown in FIGS. 3 to 11 differ from the first embodiment of the invention mainly in their brake actuating mechanisms. In the apparatus shown in FIGS. 3 to 5, the modified actuating mechanism requires minor dimensional changes in the brake disc 102, the brake housing 103, and the brackets 105, 106 integral with the housing 103. More extensive changes are seen in the brake shoe bodies 123, 124 guided in a holder 7 and the respective linings 104. An integral bracket 171 of the body 123, axially coextensive with the two linings 104 and the brake shoe body 124, carries an integral ring 125 on the far side of the body 124. Internal threads 172 of the ring 125 matingly receive a single set of external threads 173 on a hollow spindle 126.

Figure 4:
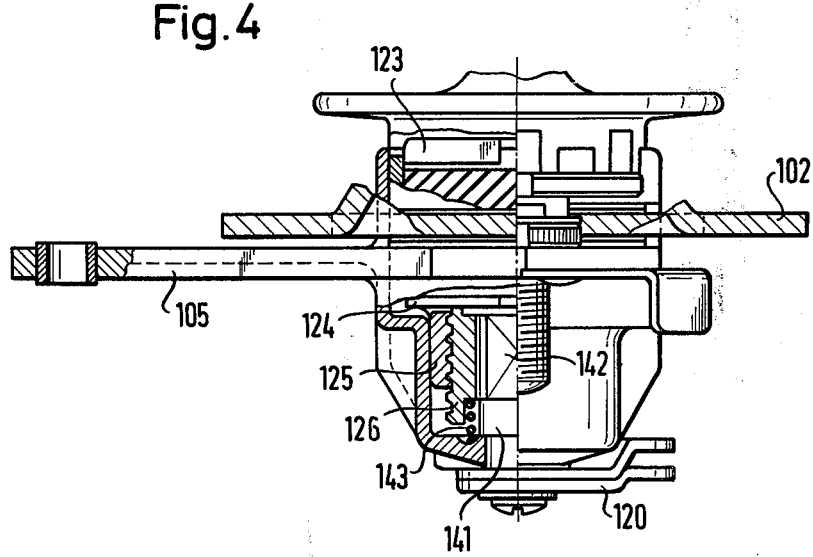
FIG. 4 illustrates the device of FIG. 3 in top plan view and partly in section.

In the condition of the disc brake illustrated in FIGS. 4 and 5, an annular end face of the spindle 126 abuts against the brake shoe body 124. The bore of the spindle 126 conformingly receives a square section 142 of a shaft 141 so that the spindle 126 may move axially on the shaft 141, but is secured against rotation. The shaft is journaled in an upright end wall of the housing 103 and carries a radial operating arm 120 outside the housing. A torsion spring 143 biases the spindle 126 in a direction to move the two brake linings 104 away from the brake disc 102.

The disc 102 passes through the slot in the brake shoe holder 7 with sufficiently small clearance to keep the disc precisely centered between the two brake linings 104. When the brake is disengaged by the spring 143, there may be frictional engagement between the disc 102 and the narrow edges of the holder 7, but none between the disc and the linings 104.

Figure 3:
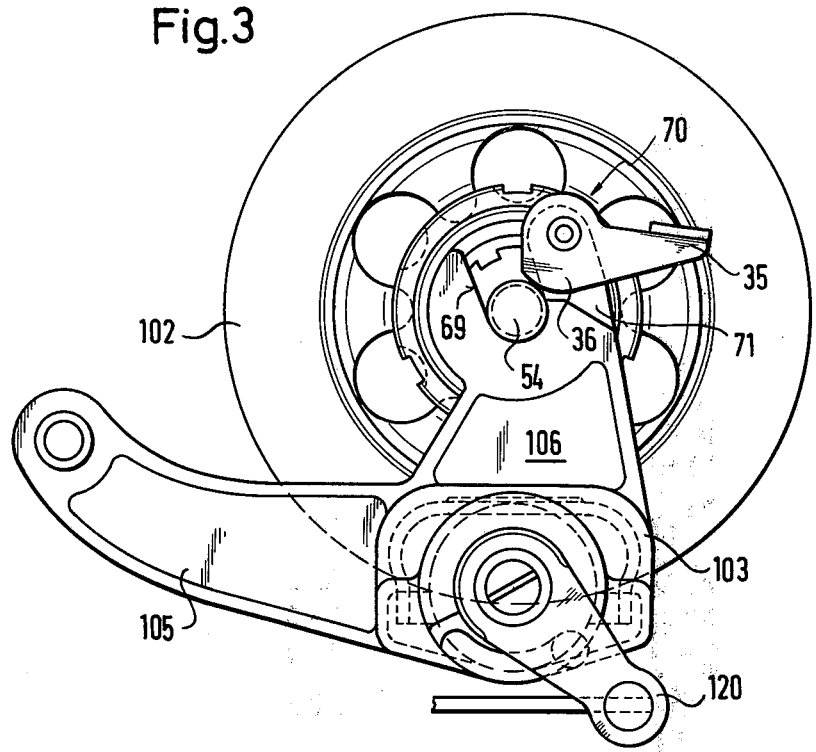
FIG. 3 shows a modification of the apparatus of FIG. 1 in a corresponding view, elements common to FIGS. 1 and 3 being partly omitted.

The disc brake shown in FIGS. 3 to 5 is assembled and disassembled for replacement of brake linings in a manner obvious from the above description of the first-discussed embodiment.

Figure 10:
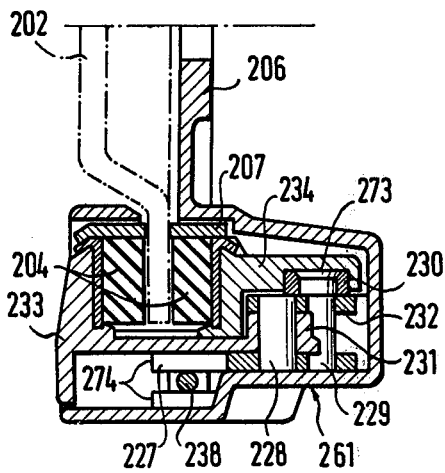
FIG. 10 shows the device of FIG. 9 in section on the line X—X.
Figure 11:
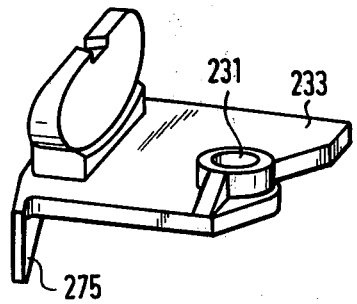
FIG. 11 illustrates the body of a brake shoe in the apparatus of FIGS. 7 to 10 in a perspective view.

The actuating mechanism 261 shown in FIGS. 7 to 11 is mounted in a housing 203 equipped with brackets 205, 206 and provided with a locking lever 235 having a cam-faced short arm 236, substantially as described above. As is best seen in FIG. 10, a brake disc 202 passes through a slot in a brake shoe holder 207 for engagement by brake linings 204 on brake shoe bodies 233, 234. The brake shoe body 233 is shown separately in FIG. 11 and has a bearing eye 231. The brake shoe body 234 is formed with a downwardly open groove 273 in which a slide ring 230 is slidably received. The groove 273 is elongated at right angles to the plane of FIG. 10. A pivot pin 229 is rotatably received in the ring 230.

The eye 231 is received between two branches 232 of a forked operating lever 227. A pivot pin 228, spacedly parallel to the pin 229, links the eye 231 to the branches 232. The pivot pin 229 similarly links the slide ring 230 to the branches 232. Yet another fork 274 of the lever 227 is fastened to the end of a control wire 238 which is manually controlled, as described above.

Figure 8:
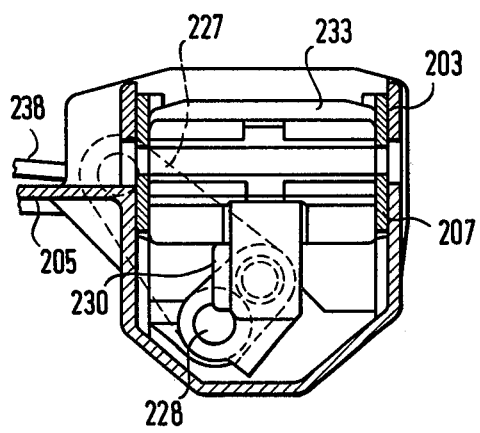
FIGS. 8 and 9 are fragmentary, sectional plan views of the brake of FIG. 7 in two different conditions of the brake shoe linings.
Figure 9:
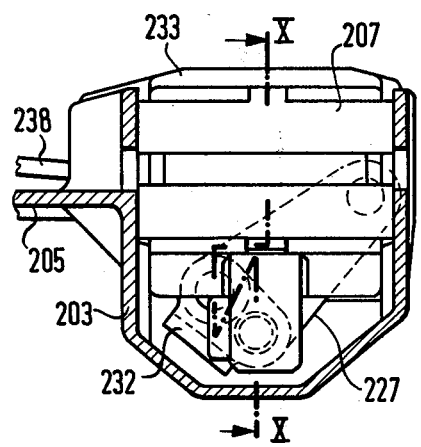

When tension is applied to the wire 238, the lever 227 pivots simultaneously on the pins 228, 229, and the brake linings 204 are brought into engagement with the disc 202. The brake is disengaged by a return spring, now shown. The angular position of the lever 227 varies with the condition of the brake linings. The position shown in broken lines in FIG. 8 is characteristic of the apparatus when the linings 204 are worn thin, while the lever may assume the position similarly indicated in FIG. 9 when the brake is equipped with new linings as shown in FIG. 10.

The open side of the housing 203 is sealed by the brake shoe body 233 as is best seen in FIG. 10, and the body 233 is equipped with a depending skirt 275 for this purpose. The brake shoe bodies 13, 123 which perform a similar function in the disc brakes shown respectively in FIGS. 1 and 2 and FIGS. 3 to 5 are also shaped with a view toward sealing the brake shoe actuating mechanisms against air borne contaminants.

In all embodiments of the invention, only a small sector of the brake disc 2, 102, 202 is engaged by the brake shoe linings 4, 104, 204, thereby making it possible to release the supporting housings 3, 103, 203 from their operating conditions together with the brake shoes and their actuating mechanisms by simply swinging the housings on the frame 50 while the brake discs remain attached to the bicycle wheels. No actual disassembly of the brake is needed. It is necessary for this purpose that the contact area between the brake shoes and the brake disc be smaller than 180°, and it is actually sufficient that this area be encompassed by an arc of less than 90° about the rear wheel axis, or about 60° as described and illustrated.

The disc brakes of the invention are simple, light in weight, and include only few and rugged parts so that they have a long useful life. The brake linings are subject to unavoidable wear, but are quickly replaced without using tools.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A disc brake for a bicycle and like vehicle having a frame and a wheel mounted on said frame for rotation about an axis, said brake comprising:
    a. a brake disc having an axis of rotation and two radially extending contact faces;
    b. first securing means for coaxially securing said disc to said wheel for joint rotation;
    c. a support;
    d. second securing means for releasably securing said support to said frame in an operative condition;
    e. a brake shoe holder of substantially U-shaped cross section mounted on said support for movement in the direction of the common axis of said disc and said wheel in said operative condition,
        1. said brake shoe holder having two flange portions and a web portion connecting said flange portions which extend from said web portion in a direction away from said common axis,
        2. said web portion being formed with a slot,
        3. said disc passing through said slot with little clearance so as to limit said movement of said brake shoe holder relative to said support in said operative condition,
        4. a portion of said disc projecting through said slot in a direction away from said common axis in said operative condition of the support;
    f. two brake shoes,
        1. said portions of said brake shoe holder jointly enveloping a portion of each brake shoe,
        2. respective parts of said brake shoe holder constituting guide means slidably engaging said brake shoes for movement of the engaged brake shoes relative to said brake shoe holder toward and away from a braking position,
        3. said brake shoes, when in said braking position, receiving said projecting portion of said disc axially therebetween and frictionally engaging said contact faces when said support is in the operative condition; and
    g. brake actuating means on said support for moving said brake shoes toward and away from said braking position.

2. A brake as set forth in claim 1, wherein respective portions of said flange portions constitute said guide means.

3. A brake as set forth in claim 1, further comprising a lug projecting from said web portion, said lug limiting movement of one of said brake shoes away from said braking position.

* * * * *